United States Patent
Saari et al.

(10) Patent No.: US 7,331,209 B2
(45) Date of Patent: Feb. 19, 2008

(54) TRANSDUCER ACCELERATION COMPENSATION WITH FREQUENCY DOMAIN AMPLITUDE AND/OR PHASE COMPENSATION

(75) Inventors: Byron J. Saari, Minneapolis, MN (US); Steven C. Soderling, Eagan, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 329 days.

(21) Appl. No.: 11/242,762

(22) Filed: Oct. 4, 2005

(65) Prior Publication Data

US 2006/0070424 A1    Apr. 6, 2006

Related U.S. Application Data

(60) Provisional application No. 60/615,798, filed on Oct. 4, 2004.

(51) Int. Cl.
*G01G 23/01* (2006.01)
(52) U.S. Cl. ............ 73/1.08; 73/1.59
(58) Field of Classification Search .......... 73/1.08, 73/1.59
See application file for complete search history.

(56) References Cited

U.S. PATENT DOCUMENTS 5,856,620 A * 1/1999 Okada ............... 73/514.32
6,209,382 B1 * 4/2001 Komata et al. ........... 73/1.13

* cited by examiner

*Primary Examiner*—Robert Raevis
(74) *Attorney, Agent, or Firm*—Steven M. Koehler; Westman, Champlin & Kelly, P.A.

(57) ABSTRACT

A method and system for correcting for the inertial error of a transducer as a function of frequency or effective mass coupling.

13 Claims, 2 Drawing Sheets

TRANSDUCER ACCELERATION COMPENSATION WITH FREQUENCY DOMAIN AMPLITUDE AND/OR PHASE COMPENSATION

CROSS-REFERENCE TO RELATED APPLICATION

The present application is based on and claims the benefit of U.S. provisional patent application Ser. No. 60/615,798, filed Oct. 4, 2004, the content of which is hereby incorporated by reference in its entirety.

BACKGROUND OF THE INVENTION

The discussion below is merely provided for general background information and is not intended to be used as an aid in determining the scope of the claimed subject matter.

The present invention relates generally to transducers such as force or pressure transducers. More particularly, the present invention relates to improved acceleration compensation for transducers.

Acceleration compensation is a technique that is often used in transducers such as force or pressure transducers. When such transducers are moved or displaced, this motion can cause error (inertial error) in the measurement. Commonly, this error is attributable to a sensor within the transducer that senses motion of a sensing (often called "active") member. The total mass of the sensing member commonly includes any components attached to the sensing member. Since the sensing member has some mass and due to motion, the sensing member has to be accelerated, a force is required. However, the force is considered erroneous, because the transducer creates the force itself, i.e. through its motion, and not by some force input.

Traditionally, force or pressure dynamic measurements are corrected for inertially induced errors with an accelerometer coupled to or placed in close proximity to the transducer such that the accelerometer senses acceleration in the direction(s) of motion in which the transducer error exists. Since the force error is proportional to the acceleration, a scalar value multiplied by the measured acceleration produces a compensation signal for the inertial error. The scalar value represents the mass of the sensing member or other object inducing the inertial error.

Although the above-described compensation technique provides a compensation signal that can significantly improve transducer accuracy, in some situations more accuracy is desired.

SUMMARY OF INVENTION

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

A method and system for correcting for the inertial error of a transducer as a function of frequency or effective mass coupling is provided. As one aspect of the invention, a system includes a transducer having an accelerometer movable with the transducer. A compensator is adapted to receive at least one signal based on the output signals from the transducer or the accelerometer. Here and for the duration of this description and figures, an accelerometer can mean an accelerometer in the purest sense or can be substituted with an alternative motion sensing transducer (i.e. displacement transducer) from which acceleration is derived through computation and/or manipulation. The compensator compensates the signal providing gain and/or phase compensation based on frequency of motion of the transducer.

As another aspect of the invention, a method of generating compensation information includes applying excitation motion to a transducer and an accelerometer and obtaining response signals therefrom. Compensation information is generated based on the response signals. The compensation information is adapted to provide at least one of gain and phase compensation based on frequency of motion of the transducer.

DETAILED DESCRIPTION OF THE ILLUSTRATIVE EMBODIMENTS

This description introduces a technique to correct for the inertial error of a transducer as a function of not only a scalar representation for mass (traditional acceleration compensation) but also as a function of frequency (or effective mass coupling). In particular, as one aspect of the present invention, a compensation signal generated from techniques of the present invention provides amplitude and/or phase compensation as a function of frequency.

Figure 1:
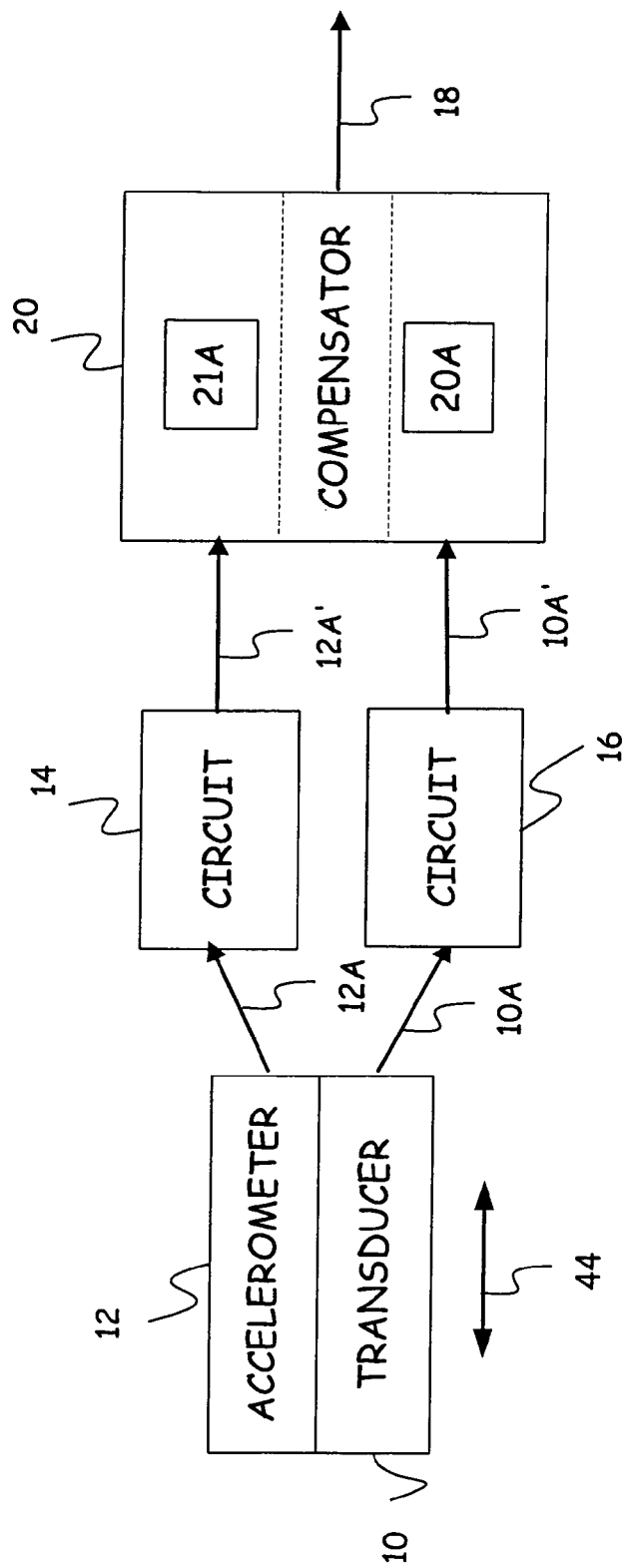
FIG. 1 is a schematic block diagram of a transducer system having a compensator to provide frequency domain compensation.

As another aspect, this technique also differs from the traditional approach because of this introduction of phase correction. Traditional approaches attempt to match phase as best as possible but do not attempt to apply correction with the knowledge of the phase implemented into the correction scheme. FIG. 1 schematically illustrates a transducer 10 (e.g. force or pressure) and an accelerometer 12, each of which provides an output signal 10A and 12A, respectively. It should be noted in the following description, the term "force" is to imply either "force" or "pressure". Also "acceleration" can be a measured acceleration or a derived acceleration.

A phase shift and/or a magnitude attenuation or amplification can exist between signals 10A and 12A as a function of frequency. In addition, a phase shift and/or a magnitude attenuation or amplification, or at least a part thereof, may also be due to processing circuits 14 and 16 receiving and processing the output signals 10A and 12A, respectively. For instance, some phase shift and/or a magnitude attenuation or amplification may occur due to different conditioners, filters, samplers, etc. that may introduce delays, or differing delays, which again may vary as a function of frequency. In one aspect of the present invention, a compensator device 20 (for example a digital or analog filter or a combination of filters) is adapted to receive one or both (herein exemplified as being applied to both) of the output signals 10A, 12A (or a function thereof 10A', 12A' if processed earlier by circuits 14, 16, as illustrated) and provide amplitude (gain) and/or phase compensation as a function of frequency to one or both of the output signals 10A, 12A in order to provide a final compensated output signal 18. As appreciated by those skilled in the art, compensator device 20 could receive the output signals 10A and/or 12A prior to circuits 14 and/or 16. Typically if compensator device 20 receives both output signals 10A, 12A prior to circuits 14, 16, then compensator device 20 would provide two output signals.

Compensator device 20 may be embodied in hardware (analog and/or digital circuitry) and/or in software operable on a suitable computing device. The output signals 10A, 12A may result from a testing environment, where the signals are compensated with compensating device 20 offline during analysis, and/or may operate in a control loop in real-time where the output signal 18, may be used to control a device.

Figure 2:
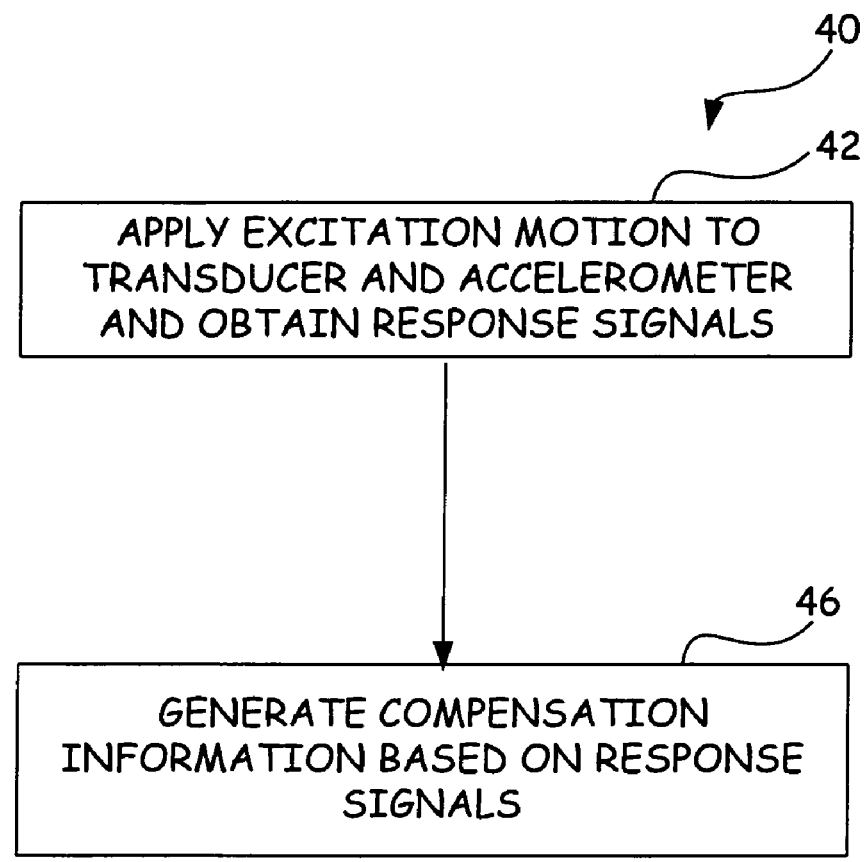
FIG. 2 is a flow chart of a method to generate compensation information.

FIG. 2 illustrates a method 40 for ascertaining compensation information (herein exemplified at 20A, 21A, one for each of the output signals 10A, 12A) stored or otherwise provided to compensating device 20 in order to provide amplitude and/or phase compensation as a function of frequency. At step 42, both the transducer and accelerometer are shaken or displaced for instance by a shaker table, schematically indicated in FIG. 1 by double arrow 44. The characteristic of the displacement/motion 44 is that it is at or across a plurality of frequencies either changed continuously or discretely and in direction(s) that generate the inertial error. For instance, the characteristic of motion 44 can be, but not limited to, white noise, pink noise, impulse, step, or sine sweep. During application of the motion excitation 44, the output signals 10A, 12A before and/or after processing by circuits 14, 16 is obtained.

It should be noted that step 42 is typically performed with or at a known, external calibration load. For instance, if transducer 10 is a force transducer, step 42 can be performed with an external calibration load of zero, i.e. no force applied. Likewise, the known, external calibration load can be at some positive or negative load, or as discussed below, step 42 can be performed at a plurality of known, external calibration loads.

At step 46, compensation information 20A, 21A is calculated or otherwise generated in manner suitable for use by compensation device 20. For instance, the frequency response function of the transducer output signal 10A with respect to the accelerometer output signal 12A is obtained. The required frequency domain correction to the output signal 10A for amplitude and phase is calculated. Calculating the inverse frequency response function of the transducer output signal 10A (as the transfer function input) to the acceleration output signal 12A (as the transfer function response or output) can perform this calculation. This can also be obtained more directly by measuring the acceleration output signal (as the transfer function input) to transducer output signal (as the transfer function response or output). Many techniques can be employed to estimate the frequency dependent transfer function representations and are familiar to those knowledgeable in the field.

Although described above where an inverse transform function can be calculated at step 46, it should be noted that compensation information 20A, 21A can be suitable for both linear and/or non-linear compensation. Non-linear compensation can take many forms depending on the knowledge of the given application or environment in which the transducer 10 and accelerometer 12 are placed. Such knowledge can be embodied as offsets, scalars, models, or the like that are integrated into the compensation information 20A, 21A that has been obtained as a function of frequency.

In yet a further embodiment as mentioned above, step 42 can be performed at a plurality of known, external calibration loads. Accordingly, compensation information 20A, 21A can be calculated or generated so as to be also based on an applied external load to transducer 12 besides being based on a function of frequency. In this manner, compensation information 20A, 21A can be multi-dimensional, where compensation of transducer output signal 10A and/or accelerometer output signal 12A can be based on frequency and one or more other factors such as external applied load, displacement of the transducer or device connected thereto, environmental factors such as temperature, etc.

In yet another embodiment, the known, external calibration load(s) can have some frequency content, and where the load(s) may be measured by a trusted (i.e., accurate) transducer, the output of which is further used to generate the compensation information 20A, 21A.

In operation as indicated above, the frequency domain amplitude and phase correction/compensation can be applied to the output signal 10A. This correction can be applied to the acceleration signal and then be added to non-compensated transducer output signal, or alternatively, the correction can be applied to the transducer output signal, then added to the accelerometer output signal, or a combination of both, the latter variation possibly being desirable if the leading and lagging signals change as a function of frequency.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A system comprising:
   a transducer;
   an accelerometer movable with the transducer; and
   a compensator adapted to receive at least one signal based on at least one of the output signals from the transducer and the accelerometer, the compensator providing at least one of gain and phase compensation based on frequency of motion of the transducer to the at least one signal.

2. The system of claim 1 wherein the transducer comprises a force transducer.

3. The system of claim 1 wherein the transducer comprises a pressure transducer.

4. The system of claim 1 wherein the compensator provides both gain and phase compensation based on frequency.

5. The system of claim 2 wherein the compensator provides at least one of gain and phase compensation based on another factor in addition to frequency.

6. The system of claim 3 wherein the compensator provides at least one of gain and phase compensation based on another factor in addition to frequency.

7. The system of claim 1 wherein the compensator provides at least one of gain and phase compensation based on another factor in addition to frequency.

8. The system of claim 7 wherein the another factor is applied external load.

9. A method of generating compensation information comprising:
   applying excitation motion to a transducer and accelerometer and obtaining response signals therefrom; and
   generating compensation information based on the response signals, the compensation information adapted to provide at least one of gain and phase compensation based on frequency of motion of the transducer.

10. The method of claim 9 wherein applying excitation motion to a transducer and accelerometer and obtaining response signals therefrom includes applying a known, external calibration load to the transducer.

11. The method of claim 10 wherein known, external calibration load to the transducer is zero.

12. The method of claim 10 wherein applying excitation motion to a transducer and accelerometer and obtaining response signals therefrom includes applying a plurality of known, external calibration loads to the transducer, and wherein generating the compensation information includes generating compensation information based on the known, external calibration loads to the transducer.

13. The method of claim 11 wherein applying excitation motion to a transducer and accelerometer and obtaining response signals therefrom includes applying a plurality of known, external calibration loads to the transducer, and wherein generating the compensation information includes generating compensation information based on the known, external calibration loads to the transducer.

* * * * *